United States Patent
Zhang (10) Patent No.: US 11,363,618 B2
(45) Date of Patent: *Jun. 14, 2022

(54) METHOD AND DEVICE FOR NARROW BAND COMMUNICATION IN UE AND BASE STATION

(71) Applicant: SHANGHAI LANGBO COMMUNICATION TECHNOLOGY COMPANY LIMITED, Shanghai (CN)

(72) Inventor: Xiaobo Zhang, Shanghai (CN)

(73) Assignee: SISVEL INTERNATIONAL S.A., Luxembourg (LU)

(*) Notice: Subject to any disclaimer, the term of this patent is extended or adjusted under 35 U.S.C. 154(b) by 113 days.

This patent is subject to a terminal disclaimer.

(21) Appl. No.: 16/702,450

(22) Filed: Dec. 3, 2019

(65) Prior Publication Data

US 2020/0107343 A1 Apr. 2, 2020

Related U.S. Application Data

(63) Continuation of application No. 15/857,594, filed on Dec. 28, 2017, now Pat. No. 10,531,480, which is a (Continued)

(30) Foreign Application Priority Data

Jan. 17, 2016 (CN) .......................... 201610029099.7

(51) Int. Cl.
  *H04W 72/12* (2009.01)
  *H04L 5/00* (2006.01)
  *H04W 72/04* (2009.01)

(52) U.S. Cl.
  CPC ....... *H04W 72/1268* (2013.01); *H04L 5/0005* (2013.01); *H04L 5/0055* (2013.01);
  (Continued)

(58) Field of Classification Search
  CPC ......... H04W 72/1268; H04W 72/1289; H04W 72/042; H04W 72/1284; H04L 5/0091;
  (Continued)

(56) References Cited

U.S. PATENT DOCUMENTS 10,506,624 B2 * 12/2019 Zhang ................... H04L 1/1812
10,531,480 B2 * 1/2020 Zhang ................... H04L 5/0005
(Continued)

FOREIGN PATENT DOCUMENTS

| CN | 101841867 A | 9/2010 |
| CN | 104168610 A | 11/2014 |
| WO | 2010145520 A1 | 12/2010 |

OTHER PUBLICATIONS

CN Office Action in application No. 201610029099.7 dated Dec. 27, 2017.
(Continued)

Primary Examiner — Walli Z Butt
(74) Attorney, Agent, or Firm — Maschoff Brennan (57) ABSTRACT

The present disclosure discloses a scheduling method and device. AUE receives a first signaling firstly and transmits a wireless signal on a target time frequency resource. The first signaling indicates a first time frequency resource, and the first time frequency resource includes a second time frequency resource. The target time frequency resource includes a time frequency resource of the first time frequency resource except the second time frequency resource. The target and the second time frequency resources are orthogonal. The first time frequency resource includes T1 sub frames in a time domain, and includes P1 sub carriers in a frequency domain. The second time frequency resource includes T2 sub frames of T1 sub frames and P1 sub carriers in a time domain. T1 and P1 are a positive integer, T2 is smaller than T1. A position of the second time frequency resource in the first time frequency resource is fixed.

12 Claims, 4 Drawing Sheets

Related U.S. Application Data continuation-in-part of application No. PCT/CN2017/071289, filed on Jan. 16, 2017.

(52) U.S. Cl.
CPC ....... *H04L 5/0091* (2013.01); *H04W 72/1289* (2013.01); *H04W 72/042* (2013.01)

(58) Field of Classification Search
CPC ... H04L 5/0055; H04L 5/0005; H04L 1/1607; H04L 1/1671; H04L 1/1861; H04L 5/0053
See application file for complete search history.

(56) References Cited

U.S. PATENT DOCUMENTS

| | | | | |
|---|---|---|---|---|
| 2016/0044642 | A1* | 2/2016 | Xu | H04W 74/0833 |
| | | | | 370/329 |
| 2017/0093540 | A1* | 3/2017 | Lei | H04J 11/0069 |
| 2018/0049164 | A1* | 2/2018 | Wu | H04W 72/1289 |
| 2018/0124817 | A1 | 5/2018 | Zhang | |

OTHER PUBLICATIONS

CN Office Action in application No. 201610029099.7 dated Jan. 16, 2018.
CN Office Action in application No. 201610029099.7 dated Feb. 24, 2018.
CN Notice of Allowance in application No. 201610029099.7 dated Mar. 20, 2018.

\* cited by examiner

METHOD AND DEVICE FOR NARROW BAND COMMUNICATION IN UE AND BASE STATION

CROSS-REFERENCE TO RELATED APPLICATIONS

This application is a continuation of U.S. patent application Ser. No. 15/857,594, filed on Dec. 28, 2017, which is a continuation-in-part of PCT Application No. PCT/CN2017/071289, filed on Jan. 16, 2017, and claims benefit to Chinese Patent Application No. CN 201610029099.7, filed on Jan. 17, 2016, all of which are hereby incorporated by reference for all purposes.

BACKGROUND

Technical Field

The present disclosure is related to a transmitting scheme in a radio communication system, and more particular to an uplink scheduling method and device for supporting a narrow band transmission.

Related Art

In the #69th 3GPP (3rd Generation Partner Project) RAN (Radio Access Network) plenary, NB-IOT (NarrowBand Internet of Things) was established. The NB-IOT supports three different operation modes (RP-151621).

1. Stand-alone operation: deployed on a spectrum used by GERAN system;
2. Guard band operation: deployed on a non-use resource block of the guard band of LTE (Long Term Evolution) carrier;
3. In-band operation: deployed on a resource block of the LTE carrier.

Further, in the NB-IOT, a UE (User Equipment) supports a radio frequency bandwidth of 180 kHz (kiloHertz) in uplink and downlink, i.e. one PRB (Physical Resource Block).

For the traditional LTE system, an uplink HARQ-ACK is transmitted on PUCCH (Physical Uplink Control Channel) or PUSCH (Physical Uplink Shared Channel). For NB-IOT, an intuitive idea is to decrease the types of the physical layer channel as much as possible, so as to reduce the complexity of the UE. Therefore, a possible scheme is that the HARQ-ACK is transmitted on the physical layer data channel, i.e. a physical layer control channel would not be particularly dedicated for the HARQ-ACK. Based on the above scheme, a problem required to be solved is that how to achieve the co-existence of the data transmitted on the physical layer data channel and the HARQ-ACK, i.e. avoiding the collision of both.

SUMMARY

The inventor researches and discovers that if an uplink HARQ-ACK and an uplink data are transmitted on the same physical layer channel, it is a problem need to be solved that how to configure a time frequency resource occupied by the uplink HARQ-ACK and a time frequency resource occupied by the uplink data to a UE. An intuitive scheme is that the base station transmits two independent downlink signaling to indicate the time frequency resource occupied by the uplink HARQ-ACK and the time frequency resource occupied by the uplink data respectively. The above intuitive scheme may result in excessive signaling redundancy or waste of resources. For example, the uplink HARQ-ACK may only exists in a part of PRBs occupied by the uplink data, i.e. the time frequency resource occupied by the uplink data in each PRB is variable. Therefore, the scheduling signaling for the uplink data may need to allocate resource for each PRB.

The present disclosure provides a solution for the above problem. It should be noted that in the absence of conflict, the embodiments and the features of the embodiments of the UE (User Equipment) of the present disclosure may be applied to a base station and vice versa. Further, in the absence of conflict, the embodiments and the features of the embodiments of the present disclosure may be combined with each other arbitrarily.

The present disclosure discloses a method for supporting a narrow band communication in a UE, which includes the following steps:

receiving a first signaling; and transmitting a wireless signal on a target time frequency resource.

Wherein the first signaling indicates a first time frequency resource, and the first time frequency resource includes a second time frequency resource. The target time frequency resource includes a time frequency resource of the first time frequency resource except the second time frequency resource. The target time frequency resource and the second time frequency resource are orthogonal. The first time frequency resource includes T1 sub frames in a time domain and includes P1 sub carriers in a frequency domain. The second time frequency resource includes T2 sub frames out of the T1 sub frames in a time domain, the second time frequency resource includes the P1 sub carriers in a time domain. The T1 and the P1 are a positive integer respectively, and the T2 is smaller than the T1.

The essence of the above method is that the UE transmits the wireless signal on a part of time frequency resource of the first time frequency resource indicated by the first signaling. In the above method, the first signaling does not need to explicitly indicate the target time frequency resource, so as to save the signaling overhead.

In one embodiment, a transmission channel corresponding to the wireless signal is UL-SCH (Uplink Shared Channel).

In the above method, the UE avoids occupying the second time frequency resource by default to transmit the wireless signal, i.e. does not need the explicit configuration, such that the overhead of the first signaling is further saved. However, when the second time frequency resource is idle, the above method can not flexibly use the second time frequency resource. In an alternative scheme, the following method solve this problem.

The present disclosure discloses a method for supporting a narrow band communication in a UE, which includes the following steps:

receiving a first signaling; and transmitting a wireless signal on a target time frequency resource.

Wherein the first signaling indicates a first time frequency resource, and the first time frequency resource includes a second time frequency resource. The target time frequency resource includes a time frequency resource of the first time frequency resource except the second time frequency resource. The first signaling indicates whether the target time frequency resource includes the second time frequency resource. The first time frequency resource includes T1 sub frames in a time domain, and includes P1 sub carriers in a frequency domain. The second time frequency resource includes T2 sub frames out of the T1 sub frames in a time domain, the second time frequency resource includes the P1 sub carriers in a time domain. The T1 and the P1 are a positive integer respectively, and the T2 is smaller than the T1.

In the above method, the first signaling explicitly indicates whether the target time frequency resource includes the second time frequency resource, and determines whether the wireless signal may occupy the second time frequency resource according to the using state of the second time frequency resource. Compared to not fully occupying the second time frequency resource, the above method improves the resource utilization efficiency, and the cost thereof is a slight increase in the overhead of the first signaling.

In one embodiment, whether the target time frequency resource includes the second time frequency resource is indicated by one bit of the first signaling.

In one embodiment, the first signaling is a physical layer signaling.

In one embodiment, the first signaling is a physical layer signaling, and the first signaling includes the scheduling information of the wireless signal.

In one embodiment, the frequency band occupied by the wireless signal at any time does not exceed 180 kHz.

In one embodiment, the first time frequency resource includes T1 sub frames in a time domain and includes P1 sub carriers in a frequency domain, and the T1 and the P1 are a positive integer respectively. In a sub embodiment of the embodiment, the second time frequency resource includes T2 sub frames out of the T1 sub frames in a time domain, and the T2 is smaller than the T1. In another sub embodiment of the embodiment, the second time frequency resource includes P2 sub carriers of the P1 sub carriers, and the P2 is smaller than or equal to the P1.

In one embodiment, the first signaling is used to DCI (Downlink Control Information) of an uplink grant.

In one embodiment, a position of the second time frequency resource in the first time frequency resource is fixed.

Specifically, according to an aspect of the present disclosure, the first time frequency resource occupies an entire narrow band in a given time window and occupies an entire time window in a time domain. The second time frequency resource occupies the entire narrow band in the given time window, and a bandwidth of the narrow band does not exceed 180 kHz.

Specifically, according to an aspect of the present disclosure, the above method further includes the following step:
receiving a second signaling.
Wherein the second signaling indicates a third time frequency resource, and the second time frequency resource is a part of the third time frequency resource.

In the above aspect, a base station may dynamically or semi-statically reserve a time frequency resource for HARQ-ACK. Compared to the scheme of the fixed (i.e. non-configured) second time frequency resource, the above method is more flexible.

In one embodiment, the third time frequency resource is a time frequency resource reserved for HARQ-ACK.

In one embodiment, the third time frequency resource is a time frequency resource reserved for UCI (Uplink Control Information), and the UCI includes {HARQ-ACK, CSI (Channel Status Information)}.

In one embodiment, the second signaling is a higher layer signaling, and the third time frequency resource is periodic in a time domain.

In one embodiment, the second signaling is a higher layer signaling.

In one embodiment, the second signaling is a cell common signaling.

In one embodiment, the second signaling is RRC (Radio Resource Control) common signaling.

In one embodiment, the second signaling is a physical layer signaling.

Specifically, according to an aspect of the present disclosure, the above method further includes the following steps:
receiving a downlink signal; and
transmitting a first HARQ-ACK, and the first HARQ-ACK indicates whether the downlink signal is correctly decoded.
Wherein the first HARQ-ACK is transmitted in the second time frequency resource, or the first HARQ-ACK is transmitted in the third time frequency resource.

In one embodiment, a transmission channel used to carry the downlink signal is DL-SCH (Downlink Shared Channel).

In one embodiment, a bandwidth occupied by the downlink signal at any time does not exceed 180 kHz.

In one embodiment, a bandwidth occupied by the first HARQ-ACK at any time does not exceed 180 kHz.

Specifically, according to an aspect of the present disclosure, the first signaling is a physical layer signaling, and the first signaling includes the scheduling information of the wireless signal. The first signaling indicates that the target time frequency resource does not include the second time frequency resource and the wireless signal adopts a rate matching scheme to avoid occupying the second time frequency resource, or the first signaling indicates that the target time frequency resource includes the second time frequency resource.

In the above aspect, since the first signaling indicates whether the target time frequency resource includes the second time frequency resource, the UE may adopt the rate matching manner to perform a resource matching on the wireless signal, so as to avoid using a puncturing manner to perform the resource matching. Compared to the puncturing, the rate matching corresponds to better receiving performance.

In one embodiment, the rate matching scheme adopted by the wireless signal to avoid occupying the second time frequency resource is that: the modulating symbols included in the wireless signal uses the manner {frequency domain firstly, time domain secondarily} to match to RU (Resource Unit) included in the target time frequency resource in sequence. The RU includes one OFDM (Orthogonal Frequency Division Multiplexing) symbol in a time domain, and includes one sub carrier in a frequency domain. The target time frequency resource is a part of the first time frequency resource except the second time frequency resource.

In one embodiment, the rate matching scheme adopted by the wireless signal to avoid occupying the second time frequency resource is that: the modulating symbols included in the wireless signal uses the manner {time domain firstly, frequency domain secondarily} to match to RU included in the target time frequency resource in sequence. The target time frequency resource is a part of the first time frequency resource except the second time frequency resource.

In one embodiment, a bandwidth of the sub carrier of the present disclosure is 15 kHz.

In one embodiment, a bandwidth of the sub carrier of the present disclosure is 3.75 kHz.

In one embodiment, the scheduling information includes at least one of {MCS (Modulation Coding Status), NDI (New Data Indicator), TBS (Transport Block Size)}.

Specifically, according to an aspect of the present disclosure, the above method further includes the following step:
receiving a third signaling.

Wherein the second signaling is a higher layer signaling, and the third signaling includes the scheduling information of the downlink signal.

In one embodiment of the above aspect, the first HARQ-ACK is transmitted in the second time frequency resource and the third signaling indicates the time frequency resource occupied by the first HARQ-ACK from the second time frequency resource.

In a sub embodiment of the above embodiment, the bandwidths occupied by the second time frequency resource and the first time frequency resource in a frequency domain are equal.

In one embodiment of the above aspect, the first HARQ-ACK is transmitted in the third time frequency resource and the third signaling indicates the time frequency resource occupied by the first HARQ-ACK from the third time frequency resource.

In a sub embodiment of the above embodiment, the bandwidth occupied by the second time frequency resource and the first time frequency resource in a frequency domain are different.

Specifically, according to an aspect of the present disclosure, the first signaling is a DCI used for uplink grant, and a transmission channel corresponding to the wireless signal is UL-SCH.

The present disclosure discloses a method for supporting a narrow band communication in a base station which includes the following steps:
transmitting a first signaling; and
receiving a wireless signal on a target time frequency resource.

Wherein the first signaling indicates a first time frequency resource, and the first time frequency resource includes a second time frequency resource. The target time frequency resource includes a time frequency resource of the first time frequency resource except the second time frequency resource. The target time frequency resource and the second time frequency resource are orthogonal, or the first signaling indicates whether the target time frequency resource includes the second time frequency resource. The first time frequency resource includes T1 sub frames in a time domain, and includes P1 sub carriers in a frequency domain. The second time frequency resource includes T2 sub frames out of the T1 sub frames in a time domain, the second time frequency resource includes the P1 sub carriers in a time domain. The T1 and the P1 are a positive integer respectively, the T2 is smaller than the T1.

In one embodiment, the position of the second time frequency resource in the first time frequency resource is fixed, i.e. it does not need to be configured by the downlink signaling.

Specifically, according to an aspect of the present disclosure, the above method further includes the following step:
transmitting a second signaling.

Wherein the second signaling indicates the third time frequency resource, and the second time frequency resource is a part of the third time frequency resource.

In one embodiment, the third time frequency resource includes a sub resource periodically appearing in a time domain, and the second time frequency resource is a sub resource appearing once therein.

Specifically, according to an aspect of the present disclosure, the first time frequency resource occupies an entire narrow band in a given time window and occupies an entire time window in a time domain. The second time frequency resource occupies the entire narrow band in the given time window, and a bandwidth of the narrow band does not exceed 180 kHz.

Specifically, according to an aspect of the present disclosure, the above method further includes the following steps:
transmitting a downlink signal; and
receiving a first HARQ-ACK, and the first HARQ-ACK indicates whether the downlink signal is correctly decoded.

Wherein the first HARQ-ACK is transmitted in the second time frequency resource, or the first HARQ-ACK is transmitted in the third time frequency resource.

Specifically, according to an aspect of the present disclosure, the first signaling is a physical layer signaling, and the first signaling includes the scheduling information of the wireless signal. The first signaling indicates that the target time frequency resource does not include the second time frequency resource and the wireless signal adopts a rate matching scheme to avoid occupying the second time frequency resource, or the first signaling indicates that the target time frequency resource includes the second time frequency resource.

Specifically, according to an aspect of the present disclosure, the above method further includes the following step:
transmitting a third signaling.

Wherein the second signaling is a higher layer signaling, and the third signaling includes the scheduling information of the downlink signal. The first HARQ-ACK is transmitted in the second time frequency resource and the third signaling indicates the time frequency resource occupied by the first HARQ-ACK from the second time frequency resource, or the first HARQ-ACK is transmitted in the third second time frequency resource and the third signaling indicates the time frequency resource occupied by the first HARQ-ACK from the third time frequency resource.

Specifically, according to an aspect of the present disclosure, the first signaling is a DCI used for uplink grant, and a transmission channel corresponding to the wireless signal is UL-SCH.

The present disclosure discloses a user equipment for supporting a narrow band communication, includes the following modules:
a first module, for receiving a first signaling; and
a second module, for transmitting a wireless signal on a target time frequency resource.

Wherein the first signaling indicates a first time frequency resource, and the first time frequency resource includes a second time frequency resource. The target time frequency resource includes a time frequency resource of the first time frequency resource except the second time frequency resource. The target time frequency resource and the second time frequency resource are orthogonal, or the first signaling indicates whether the target time frequency resource includes the second time frequency resource. The first time frequency resource includes T1 sub frames in a time domain, and includes P1 sub carriers in a frequency domain. The second time frequency resource includes T2 sub frames out of the T1 sub frames in a time domain, the second time frequency resource includes the P1 sub carriers in a time domain. The T1 and the P1 are a positive integer respectively, the T2 is smaller than the T1.

In one embodiment of the above user equipment, the first module is further used for receiving a second signaling. Wherein the second signaling indicates a third time frequency resource, and the second time frequency resource is a part of the third time frequency resource.

In one embodiment of the above user equipment, the first time frequency resource occupies an entire narrow band in a given time window and occupies an entire time window in a time domain. The second time frequency resource occupies the entire narrow band in the given time window, and a bandwidth of the narrow band does not exceed 180 kHz.

In one embodiment of the above user equipment, the first module is further used for receiving a downlink signal; and the second module is further used for transmitting a first HARQ-ACK, and the first HARQ-ACK indicates whether the downlink signal is correctly decoded.

Wherein the first HARQ-ACK is transmitted in the second time frequency resource, or the first HARQ-ACK is transmitted in the third time frequency resource.

In one embodiment of the above user equipment, the first signaling is a physical layer signaling, the first signaling includes the scheduling information of the wireless signal. The first signaling indicates that the target time frequency resource does not include the second time frequency resource and the wireless signal adopts a rate matching scheme to avoid occupying the second time frequency resource, or the first signaling indicates that the target time frequency resource includes the second time frequency resource.

In one embodiment of the above user equipment, the first signaling is a DCI used for uplink grant, and a transmission channel corresponding to the wireless signal is UL-SCH.

In one embodiment of the above user equipment, a third module is used for receiving a third signaling. Wherein the second signaling is a higher layer signaling, and the third signaling includes the scheduling information of the downlink signal. The first HARQ-ACK is transmitted in the second time frequency resource and the third signaling indicates the time frequency resource occupied by the first HARQ-ACK from the second time frequency resource, or the first HARQ-ACK is transmitted in the third time frequency resource and the third signaling indicates the time frequency resource occupied by the first HARQ-ACK from the third time frequency resource.

The present disclosure discloses a base station equipment for supporting a narrow band communication, which includes the following modules:

a first module, for transmitting a first signaling; and a second module, for receiving a wireless signal on a target time frequency resource.

Wherein the first signaling indicates a first time frequency resource, and the first time frequency resource includes a second time frequency resource. The target time frequency resource includes a time frequency resource of the first time frequency resource except the second time frequency resource. The target time frequency resource and the second time frequency resource are orthogonal, or the first signaling indicates whether the target time frequency resource includes the second time frequency resource. The first time frequency resource includes T1 sub frames in a time domain, and includes P1 sub carriers in a frequency domain. The second time frequency resource includes T2 sub frames out of the T1 sub frames in a time domain, the second time frequency resource includes the P1 sub carriers in a time domain. The T1 and the P1 are a positive integer respectively, the T2 is smaller than the T1.

In one embodiment of the base station equipment, the first module is further used for transmitting a second signaling. Wherein the second signaling indicates a third time frequency resource, and the second time frequency resource is a part of the third time frequency resource.

In one embodiment of the base equipment, the first time frequency resource occupies an entire narrow band in a given time window and occupies an entire time window in a time domain. The second time frequency resource occupies the entire narrow band in the given time window, and a bandwidth of the narrow band does not exceed 180 kHz.

In one embodiment of the base station equipment, the first signaling is a DCI used for uplink grant, and a transmission channel corresponding to the wireless signal is UL-SCH.

In one embodiment of the base station equipment, the first module is used for transmitting a downlink signal; and the second module is used for receiving a first HARQ-ACK, and the first HARQ-ACK indicates whether the downlink signal is correctly decoded.

Wherein the first HARQ-ACK is transmitted in the second time frequency resource, or the first HARQ-ACK is transmitted in the third time frequency resource.

In one embodiment of the base station equipment, the first signaling is a physical layer signaling, and the first signaling includes the scheduling information of the wireless signal. The first signaling indicates that the target time frequency resource does not include the second time frequency resource and the wireless signal adopts a rate matching scheme to avoid occupying the second time frequency resource, or the first signaling indicates that the target time frequency resource includes the second time frequency resource.

In one embodiment of the base station equipment, a third module is further used for transmitting a third signaling. Wherein the second signaling is a higher layer signaling, and the third signaling includes the scheduling information of the downlink signal. The first HARQ-ACK is transmitted in the second time frequency resource and the third signaling indicates the time frequency resource occupied by the first HARQ-ACK from the second time frequency, or the first HARQ-ACK is transmitted in the third time frequency resource and the third signaling indicates the time frequency resource occupied by the first HARQ-ACK from the third time frequency resource.

Compared to the existing disclosed technique, the present disclosure has the following advantages.

The overhead for scheduling the signaling of the HARQ-ACK and the uplink data is decreased, so as to improve the transmission efficiency.

The collision of the HARQ-ACK and the uplink data is avoided, and the resource of the physical layer data channel is fully used as much as possible at the same time.

BRIEF DESCRIPTION OF THE DRAWINGS

The above and other exemplary aspects, features and advantages of certain exemplary embodiments of the present disclosure will be more apparent from the following description taken in conjunction with the accompanying drawings, in which.

DETAILED DESCRIPTION

The following description with reference to the accompanying drawings is provided to explain the exemplary embodiments of the disclosure. Note that in the case of no conflict, the embodiments of the present disclosure and the features of the embodiments may be arbitrarily combined with each other.

Embodiment I

Figure 1:
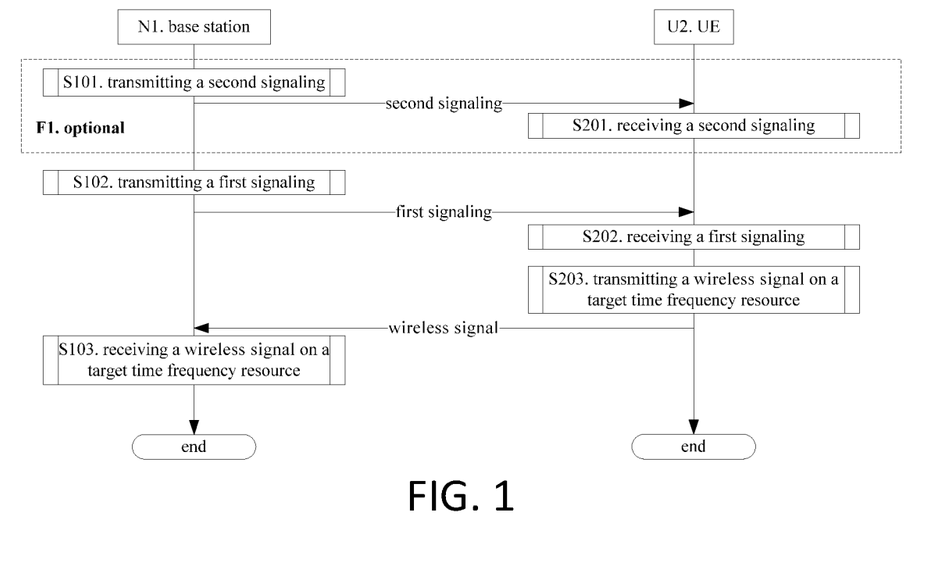
FIG. 1 is a flowchart of an uplink transmission of a wireless signal according to one embodiment of the present disclosure.

Embodiment I illustrates a flowchart of an uplink transmission of a wireless signal, as shown in FIG. 1. In FIG. 1, a base station N1 is a maintenance base station of a serving cell of UE U2, and the step identified by a square frame F1 is optional.

For the base station N1, in step S101, the method involves transmitting a second signaling. In step S102, the method involves transmitting a first signaling, and in step S103, the method involves receiving a wireless signal on a target time frequency resource.

For the UE U2, in step S201, the method involves receiving a second signaling. In step S202, the method involves receiving a first signaling, and in step S203, the method involves transmitting a wireless signal on a target time frequency resource.

In Embodiment I, the second signaling indicates a third time frequency resource, and the second time frequency resource is a part where the third time frequency resource and the first time frequency resource overlap each other. The first signaling indicates a first time frequency resource, and the first time frequency resource includes a second time frequency resource. The target time frequency resource includes a time frequency resource of the first time frequency resource except the second time frequency resource. The target time frequency resource and the second time frequency resource are orthogonal (i.e. not include the second time frequency resource), or the first signaling indicates whether the target time frequency resource includes the second time frequency resource (the first signaling indicates that the target time frequency resource includes the second time frequency resource, i.e. the target time frequency resource is the first time frequency resource). The second signaling is a higher layer signaling.

In a first exemplary embodiment of Embodiment I, the first signaling is a physical layer signaling, and the second signaling is RRC common signaling. The carrying channel corresponding to the wireless signal is UL-SCH.

In a second exemplary embodiment of Embodiment I, the first time frequency resource includes T1 continuous sub frames in a time domain, and includes P1 sub carriers in a frequency domain of each sub frame, the T1 and the P1 are a positive, the second time frequency resource includes T2 sub frames out of the T1 sub frames in a time domain, and the T2 is smaller than the T1.

In a third exemplary embodiment of Embodiment I, the first signaling includes the scheduling information of the wireless signal. The first signaling indicates that the target time frequency resource does not includes the second time frequency resource and the wireless signal adopts a rate matching scheme to avoid occupying the second time frequency resource, or the first signaling indicates that the target time frequency resource includes the second time frequency resource and the target time frequency resource includes the second time frequency resource.

Embodiment II

Figure 2:
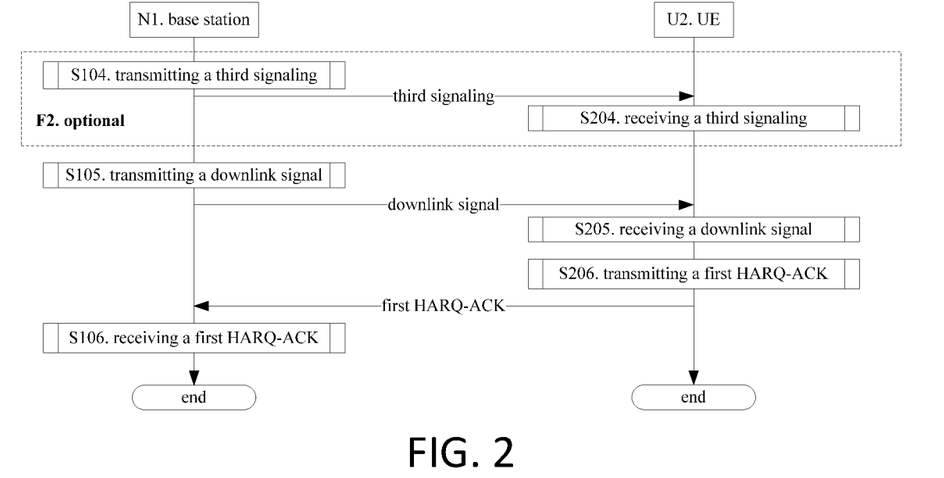
FIG. 2 is a flowchart of an uplink HARQ-ACK transmission according to one embodiment of the present disclosure.

Embodiment II illustrates a flowchart of an uplink HARQ-ACK transmission, as shown in FIG. 2. In FIG. 2, a base station N1 is a maintenance base station of a serving cell of UE U2, and the step identified by a square frame F1 is optional.

For the base station N1, in step S104, the method involves transmitting a third signaling, in step S105, the method involves transmitting a downlink signal, and in step S106, the method involves receiving a first HARQ-ACK.

For the UE U2, in step S204, the method involves receiving a third signaling, in step S205, the method involves receiving a downlink signal, and in step S206, the method involves transmitting a first HARQ-ACK.

In Embodiment II, the first HARQ-ACK indicates whether the downlink signal is correctly decoded, and the first HARQ-ACK is transmitted in a third time frequency resource. In the present disclosure, the second signaling is a higher layer signaling, and the third signaling includes the scheduling information of the downlink signal. The first HARQ-ACK is transmitted in the third time frequency resource and the third signaling indicates the time frequency resource occupied by the first HARQ-ACK from the third signaling.

In a first exemplary embodiment of Embodiment II, the time domain resource occupied by the first HARQ-ACK and the wireless signal of the present disclosure are orthogonal (i.e. non-overlapping).

In a second exemplary embodiment of Embodiment II, the third signaling is a physical layer signaling.

In a third exemplary embodiment of Embodiment II, the downlink signal includes one transmission block.

Embodiment III

Figure 3:
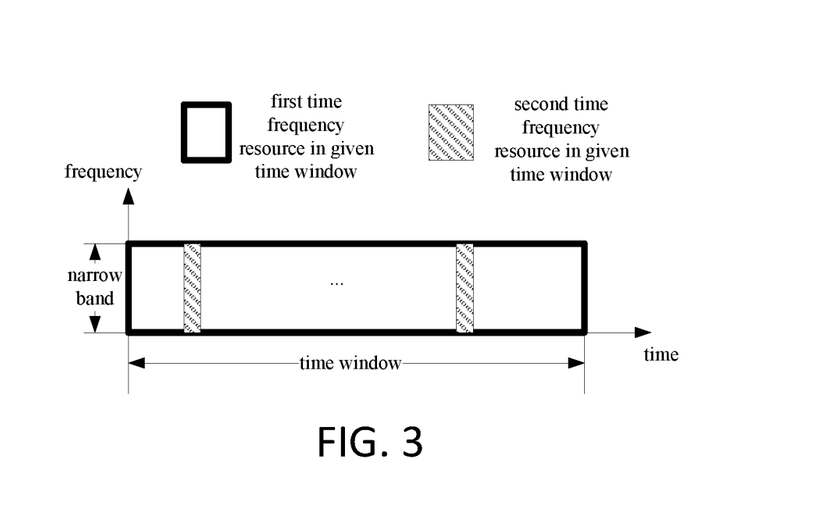
FIG. 3 is a diagram illustrating a first time frequency resource and a second time frequency resource in a given time window according to one embodiment of the present disclosure.

Embodiment III illustrates a first time frequency resource and a second time frequency resource in a given time window, as shown in FIG. 3. In FIG. 3, a thick line frame identifies a time frequency resource occupied by the first time frequency resource in one time window, and a backslash identifies a time frequency resource occupied by the second time frequency resource in one time window.

In Embodiment III, the first time frequency resource occupies an entire narrow band in the given time window and occupies an entire time window in a time domain. The second time frequency resource occupies the entire narrow band in the given time window and occupies a part of OFDM symbols of the given time window in a time domain.

In a first exemplary embodiment of Embodiment III, a bandwidth of the narrow band does not exceed 180 kHz.

In a second exemplary embodiment of Embodiment III, a duration of the time window is T ms, and the T is a positive integer.

In a third exemplary embodiment of Embodiment III, the first time frequency resource only occupies one time window in the time domain.

In a fourth exemplary embodiment of Embodiment III, the first time frequency resource occupies a plurality of time windows in the time domain.

Embodiment IV

Figure 4:
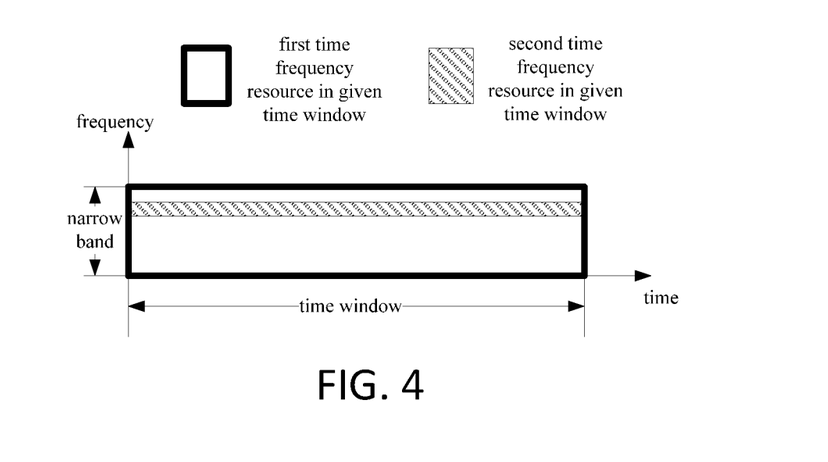
FIG. 4 is a diagram illustrating a first time frequency resource and a second time frequency resource in a given time window according to another embodiment of the present disclosure.

Embodiment IV illustrates a first time frequency resource and a second time frequency resource in a given time window, as shown in FIG. 4. In FIG. 4, a thick line frame identifies a time frequency resource occupied by the first time frequency resource in one time window, and a backslash identifies a time frequency resource occupied by the second time frequency resource in one time window.

In Embodiment IV, the first time frequency resource occupies an entire narrow band in the given time window and occupies an entire time window in a time domain. The second time frequency resource occupies a part of sub carriers of the entire narrow band in a given time window, and occupies entire given time window in the time domain.

Embodiment V

Figure 5:
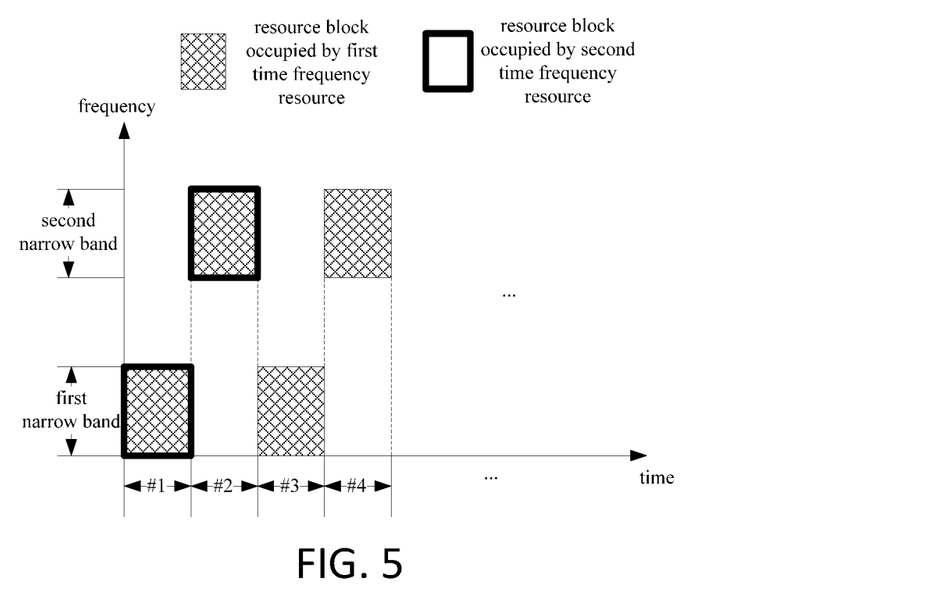
FIG. 5 is a diagram illustrating resource blocks occupied by a first time frequency resource and a second time frequency resource according to one embodiment of the present disclosure.

Embodiment V illustrates a diagram of resources blocks occupied by a first time frequency resource and a second time frequency resource, as shown in FIG. 5. In FIG. 5, a thick line frame identifies a resource block occupied by the second time frequency resource, and a cross line identifies a resource block occupied by the first time frequency resource. Each of bidirectional arrows {#1, #2, . . . } identifies one time window respectively.

In Embodiment V, the resource block occupies one time window in a time domain, and occupies one narrow band in a frequency domain. The first time frequency resource hops on a first narrow band and a second narrow band. The resource block occupied by the second time frequency resource is a part of resource blocks occupied by the first time frequency resource.

In a first exemplary embodiment of Embodiment V, RU pattern occupied by the first time frequency resource in each of resource blocks is identical.

In a second exemplary embodiment of Embodiment V, the first time frequency resource only occupies a part of RUs in each of resource blocks.

Embodiment VI

Figure 6:
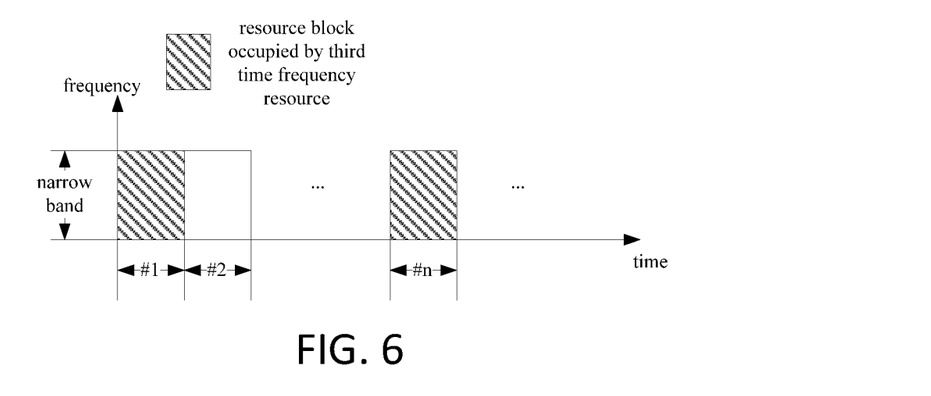
FIG. 6 is a diagram illustrating a resource block occupied by a third time frequency resource according to one embodiment of the present disclosure.

Embodiment VI illustrates a diagram of resources blocks occupied by a third time frequency resource, as shown in FIG. 6. In FIG. 6, a backslash identifies a resource block occupied by the third time frequency resource. Each of bidirectional arrows {#1, #2, . . . } identifies one time window respectively.

In Embodiment VI, the resource block occupied by the third time frequency resource in the time domain is noncontinuous, and the resource occupies one narrow band in the frequency domain and occupies one time window in the time domain.

In a first exemplary embodiment of Embodiment VI, the resource block occupied by the third time frequency resource is periodically appeared in a time domain, and the appeared period is n time window. The n is a positive integer greater than 1.

In a second exemplary embodiment of Embodiment VI, the second time frequency resource only occupies one resource block of the third time frequency resource.

In a third exemplary embodiment of Embodiment VI, the first HARQ-ACK of the present disclosure is transmitted in the third time frequency resource, and the third signaling of the present disclosure indicates the resource block occupied by the first HARQ-ACK from the resource block occupied by the third time frequency resource. In a sub embodiment, the time frequency resource occupied by the first HARQ-ACK in the block resource is default (i.e. does not need the signaling configuration).

In a fourth exemplary embodiment of Embodiment VI, a bandwidth of the narrow band is 180 kHz.

In a fifth exemplary embodiment of Embodiment VI, the RU occupied by the third time frequency resource in the resource block is fixed (i.e. does not need the signaling configuration).

Embodiment VII

Figure 7:
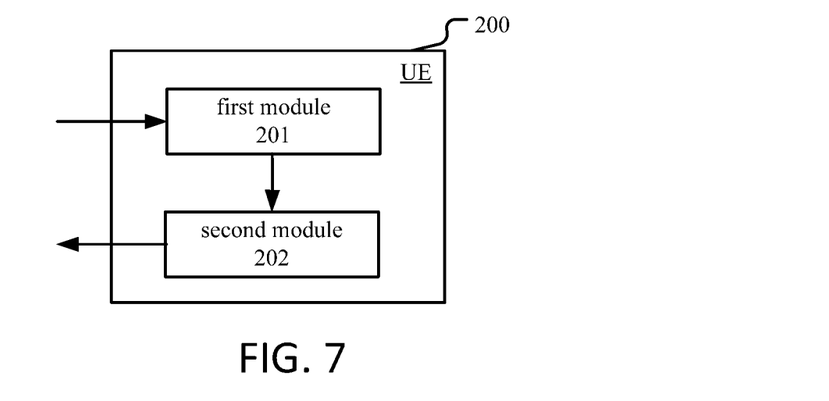
FIG. 7 is a structure diagram illustrating a processing apparatus used in a UE according to one embodiment of the present disclosure.

Embodiment VII is a structure diagram illustrating a processing apparatus used in a UE, as shown in FIG. 7. In FIG. 7, the UE processing apparatus 200 mainly includes a first module 201 and a second module 202.

The first receiving module 201 is used for receiving a first signaling and receiving a second signaling. The second receiving module 202 is used for transmitting a wireless signal on a target time frequency resource.

In Embodiment VII, the first signaling is a physical layer signaling, and the second signaling is a higher layer signaling. The first signaling indicates a first time frequency resource, and the first time frequency resource includes a second time frequency resource. The target time frequency resource includes a time frequency resource of the first time frequency resource except the second time frequency resource. The target time frequency resource and the second time frequency resource are orthogonal, or the first signaling indicates whether the target time frequency resource includes the second time frequency resource. The second signaling indicates a third time frequency resource, and the second time frequency resource is a part of the third time frequency resource.

In a first exemplary embodiment of Embodiment VII, the first module 201 is further used for receiving a downlink signal, and the second module 202 is used for transmitting a first HARQ-ACK. Wherein the first HARQ-ACK indicates whether the downlink signal is correctly decoded. The first HARQ-ACK is transmitted in the second time frequency resource, or the first HARQ-ACK is transmitted in the third time frequency resource.

Embodiment VIII

Figure 8:
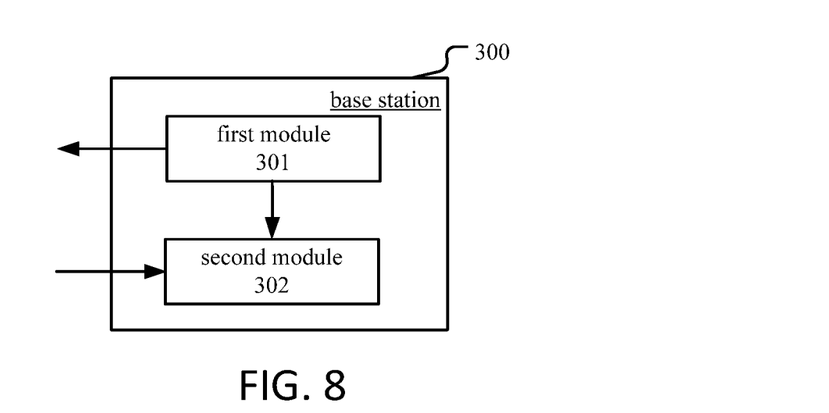
FIG. 8 is a structure diagram illustrating a processing apparatus used in a base station according to one embodiment of the present disclosure.

Embodiment VIII is a structure diagram illustrating a processing apparatus used in a base station, as shown in FIG. 8. In FIG. 8, the base station processing apparatus 300 mainly includes a first module 301 and a second module 302.

The first module 301 is used for transmitting a first signaling and a second signaling. The second module 302 is used for receiving a wireless signal on a target time frequency resource.

In Embodiment VIII, the first signaling is a physical layer signaling, and the second signaling is a higher layer signaling. The first signaling indicates a first time frequency resource. The target time frequency resource includes a time frequency resource of the first time frequency resource except the second time frequency resource. The target time frequency resource and the second time frequency resource are orthogonal, or the first signaling indicates whether the target time frequency resource includes the second time frequency resource. The second signaling indicates a third time frequency, and the second time frequency resource is a part where the third time frequency resource and the first time frequency resource overlap.

In a first exemplary embodiment of Embodiment VIII, the first signaling includes the scheduling information of the wireless signal. The first signaling indicates that the target time frequency resource does not include the second time frequency resource and the wireless signal adopts a rate matching scheme to avoid occupying the second time frequency resource, or the first signaling indicates that the target time frequency resource includes the second time frequency resource.

Those of ordinary skill will be appreciated that all or part of the above method may be accomplished by a program instructing related hardware. The program may be stored in a computer-readable storage medium, such as read-only memory, a hard disk or CD-ROM. Alternatively, all or part of the steps of the above-described embodiments may be accomplished by one or more integrated circuits. Accordingly, each module in the above-described embodiments may be accomplished by hardware implementation, or may also be realized by the form of software modules. The present disclosure is not limited to any particular form of combination of software and hardware. The UE, the ordinary UE and the ordinary terminal of the present disclosure include, but not limited to a wireless communication device, such as a mobile phone, a tablet computer, a notebook, a vehicle-mounted communication device, a wireless sensor, a network card, etc. The narrow band terminal of the present disclosure includes, but not limited to a wireless communication device, such as a IOT (Internet of Things) terminal, a RFID terminal, a NB-IOT terminal, a MTC (Machine Type Communication) terminal, a eMTC (enhanced MTC) terminal, a data card, a network card, a vehicle-mounted communication device, a low-cost mobile phone, a low-cost tablet computer, etc. The base station of the present disclosure includes, but not limited to a wireless communication device, such as a macrocell base station, a microcell base station, a home base station, a relay base station, etc.

Although the present disclosure is illustrated and described with reference to specific embodiments, those skilled in the art will understand that many variations and modifications are readily attainable without departing from the spirit and scope thereof as defined by the appended claims and their legal equivalents.

The invention claimed is:

1. A method for supporting a narrow band communication in a UE, comprising:
  receiving a first signaling; and
  transmitting a wireless signal on a target time frequency resource;
  wherein the first signaling indicates a first time frequency resource, the first time frequency resource comprises a second time frequency resource, the target time frequency resource comprises a time frequency resource of the first time frequency resource except the second time frequency resource, the target time frequency resource and the second time frequency resource are orthogonal with respect to time such that the target time frequency resource and the second time frequency resource do not overlap each other in time, the first time frequency resource comprises T1 sub frames in a time domain, and comprises P1 sub carriers in a frequency domain, the second time frequency resource comprises T2 sub frames out of the T1 sub frames in a time domain, the second time frequency resource comprises the P1 sub carriers in a time domain, the T1 and the P1 are a positive integer respectively, the T2 is smaller than the T1, and a position of the second time frequency resource in the first time frequency resource is fixed; the first signaling is a physical layer signaling, and the first signaling includes the scheduling information of the wireless signal; the scheduling information includes at least one of MCS, NDI, and TBS; wherein the first signaling indicates that the target time frequency resource does not comprise the second time frequency resource and the modulating symbols included in the wireless signal uses the manner {frequency domain firstly, time domain secondarily} to match to RU included in the target time frequency resource in sequence, the RU includes one OFDM symbol in a time domain, and includes one sub carrier in a frequency domain, the target time frequency resource is a part of the first time frequency resource except the second time frequency resource.

2. The method according to claim 1, wherein the first time frequency resource occupies an entire narrow band in a given time window and occupies an entire time window in a time domain, the second time frequency resource occupies the entire narrow band in the given time window, and a bandwidth of the narrow band does not exceed 180 kHz; the sub carriers has a bandwidth of 15 kHz, or the sub carrier has a bandwidth of 3.75 kHz.

3. The method according to claim 1, wherein the first signaling is a DCI used for uplink grant, and a transmission channel corresponding to the wireless signal is UL-SCH.

4. A method for supporting a narrow band communication in a base station, comprising:
  transmitting a first signaling; and
  receiving a wireless signal on a target time frequency resource;
  wherein the first signaling indicates a first time frequency resource, the first time frequency resource comprises a second time frequency resource, the target time frequency resource comprises a time frequency resource of the first time frequency resource except the second time frequency resource, the target time frequency resource and the second time frequency resource are orthogonal with respect to time such that the target time frequency resource and the second time frequency resource do not overlap each other in time, the first time frequency resource comprises T1 sub frames in a time domain, and comprises P1 sub carriers in a frequency domain, the second time frequency resource comprises T2 sub frames out of the T1 sub frames in a time domain, the second time frequency resource comprises the P1 sub carriers in a time domain, the T1 and the P1 are a positive integer respectively, the T2 is smaller than the T1, and a position of the second time frequency resource in the first time frequency resource is fixed; the first signaling is a physical layer signaling, and the first signaling includes the scheduling information of the wireless signal; the scheduling information includes at least one of MCS, NDI, and TBS ; wherein the first signaling is a physical layer signaling, the first signaling comprises the scheduling information of the wireless signal, the first signaling indicates that the target time frequency resource does not comprise the second time frequency resource and the modulating symbols included in the wireless signal uses the manner {frequency domain firstly, time domain secondarily} to match to RU included in the target time frequency resource in sequence, the RU includes one OFDM symbol in a time domain, and includes one sub carrier in a frequency domain, the target time frequency resource is a part of the first time frequency resource except the second time frequency resource.

5. The method according to claim 4, wherein the first time frequency resource occupies an entire narrow band in a given time window and occupies an entire time window in a time domain, the second time frequency resource occupies the entire narrow band in the given time window, and a bandwidth of the narrow band does not exceed 180 kHz.

6. The method according to claim 4, wherein the first signaling is a DCI used for uplink grant, and a transmission channel corresponding to the wireless signal is UL-SCH.

7. A user equipment for supporting a narrow band communication, comprising:
a first receiver configured to receive a first signaling, the first receiver including one or more of hardware and instructions stored in computer-readable storage media; and
a second transmitter configured to transmit a wireless signal on a target time frequency resource, the second transmitter including one or more of hardware and instructions stored in computer-readable storage media;
wherein the first signaling indicates a first time frequency resource, the first time frequency resource comprises a second time frequency resource, the target time frequency resource comprises a time frequency resource of the first time frequency resource except the second time frequency resource, the target time frequency resource and the second time frequency resource are orthogonal with respect to time such that the target time frequency resource and the second time frequency resource do not overlap each other in time, the first time frequency resource comprises T1 sub frames in a time domain, and comprises P1 sub carriers in a frequency domain, the second time frequency resource comprises T2 sub frames out of the T1 sub frames in a time domain, the second time frequency resource comprises the P1 sub carriers in a time domain, the T1 and the P1 are a positive integer respectively, the T2 is smaller than the T1, and a position of the second time frequency resource in the first time frequency resource is fixed; the first signaling is a physical layer signaling, and the first signaling includes the scheduling information of the wireless signal; the scheduling information includes at least one of MCS, NDI, and TBS; wherein the first signaling is a physical layer signaling, the first signaling comprises the scheduling information of the wireless signal, the first signaling indicates that the target time frequency resource does not comprise the second time frequency resource and the modulating symbols included in the wireless signal uses the manner {frequency domain firstly time domain secondarily} to match to RU included in the target time frequency resource in sequence, the RU includes one OFDM symbol in a time domain, and includes one sub carrier in a frequency domain,the target time frequency resource is a part of the first time frequency resource except the second time frequency resource.

8. The user equipment according to claim 7, wherein the first time frequency resource occupies an entire narrow band in a given time window and occupies an entire time window in a time domain, the second time frequency resource occupies the entire narrow band in the given time window, and a bandwidth of the narrow band does not exceed 180 kHz.

9. The user equipment according to claim , wherein the first signaling is a DCI used for uplink grant, and a transmission channel corresponding to the wireless signal is UL-SCH.

10. A base station equipment for supporting a narrow band communication, comprising:
a first transmitter configured to transmit a first signaling, the first transmitter including one or more of hardware and instructions stored in computer-readable storage media; and
a second receiver configured to receive a wireless signal on a target time frequency resource, the second receiver including one or more of hardware and instructions stored in computer-readable storage media;
wherein the first signaling indicates a first time frequency resource, the first time frequency resource comprises a second time frequency resource, the target time frequency resource comprises a time frequency resource of the first time frequency resource except the second time frequency resource, the target time frequency resource and the second time frequency resource are orthogonal with respect to time such that the target time frequency resource and the second time frequency resource do not overlap each other in time, the first time frequency resource comprises T1 sub frames in a time domain, and comprises P1 sub carriers in a frequency domain, the second time frequency resource comprises T2 sub frames out of the T1 sub frames in a time domain, the second time frequency resource comprises the P1 sub carriers in a time domain, the T1 and the P1 are a positive integer respectively, the T2 is smaller than the T1, and a position of the second time frequency resource in the first time frequency resource is fixed; the first signaling is a physical layer signaling, and the first signaling includes the scheduling information of the wireless signal; the scheduling information includes at least one of MCS, NDI, and TBS; wherein the first signaling is a physical layer signaling, the first signaling comprises the scheduling information of the wireless signal, the first signaling indicates that the target time frequency resource does not comprise the second time frequency resource and the modulating symbols included in the wireless signal uses the manner {frequency domain firstly time domain secondarily} to match to RU included in the target time frequency resource in sequence, the RU includes one OFDM symbol in a time domain, and includes one sub carrier in a frequency domain, the target time frequency resource is a part of the first time frequency resource except the second time frequency resource.

11. The base station equipment according to claim 10, wherein the first time frequency resource occupies an entire narrow band in a given time window and occupies an entire time window in a time domain, the second time frequency resource occupies the entire narrow band in the given time window, and a bandwidth of the narrow band does not exceed 180 kHz.

12. The base station equipment according to claim 10, wherein the first signaling is a DCI used for uplink grant, and a transmission channel corresponding to the wireless signal is UL-SCH.

* * * * *